April 15, 1952     D. W. KELBEL     2,592,576
CLUTCH CONTROL
Filed Sept. 7, 1944     3 Sheets-Sheet 1
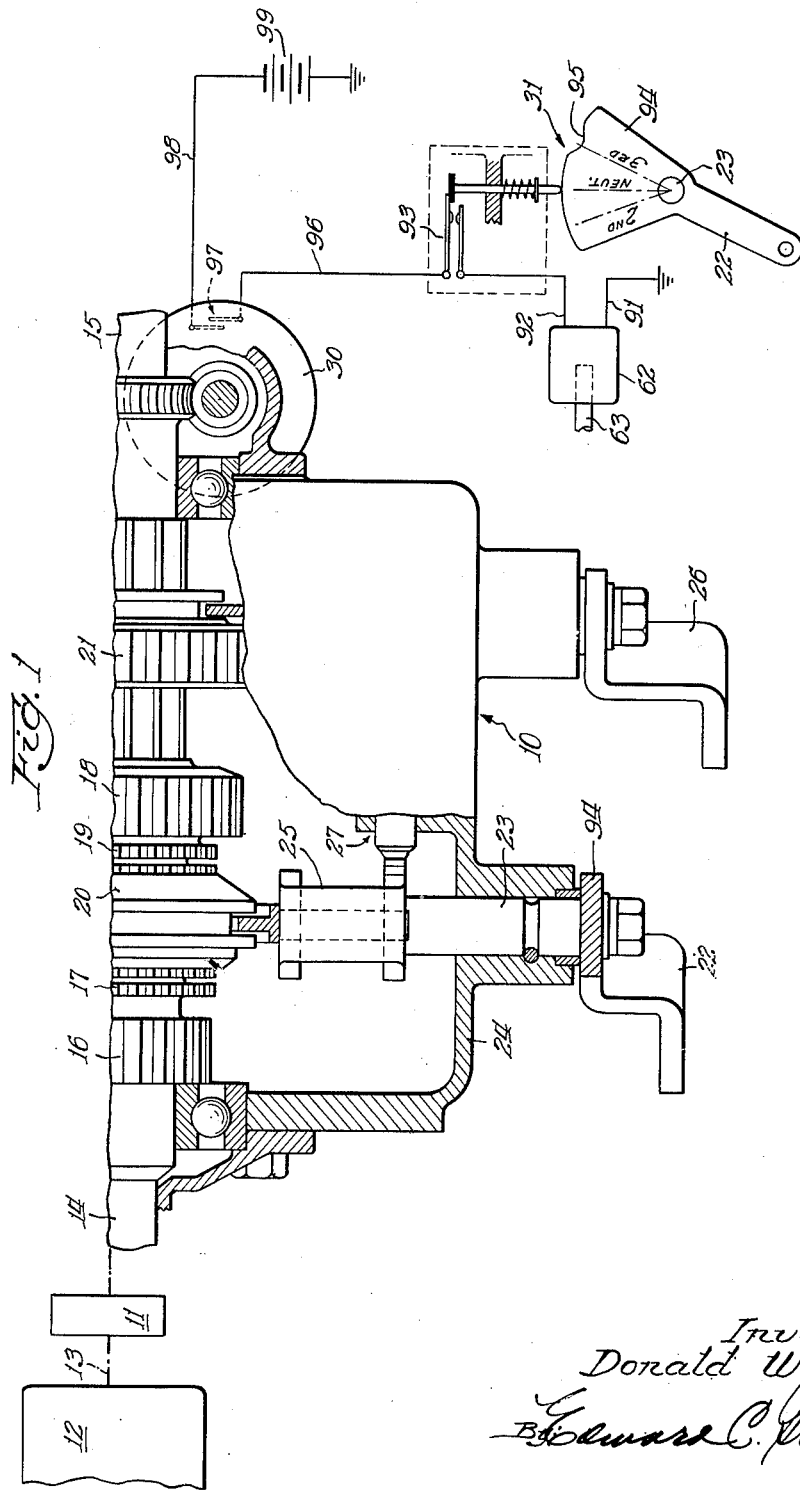
Inventor:
Donald W. Kelbel April 15, 1952 D. W. KELBEL 2,592,576
CLUTCH CONTROL
Filed Sept. 7, 1944 3 Sheets-Sheet 2
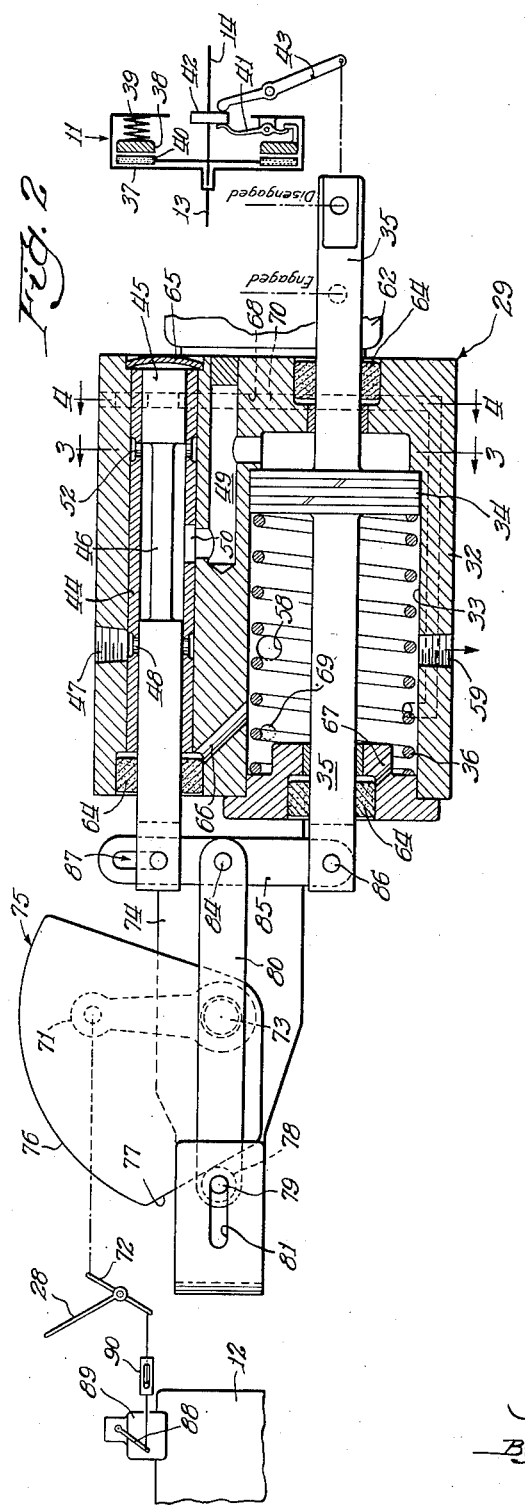
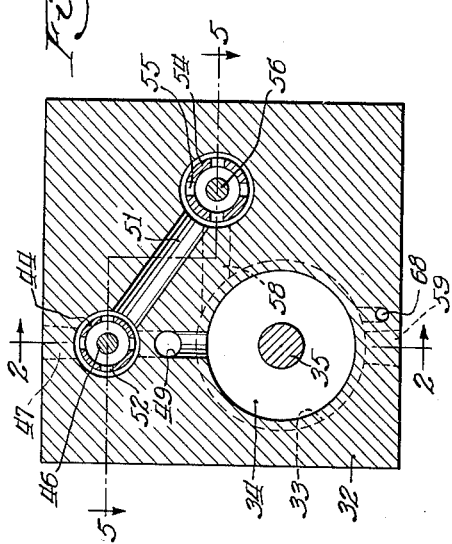
Inventor:
Donald W. Kelbel
By Edward C. Fitzhugh
Atty.

April 15, 1952  D. W. KELBEL  2,592,576
CLUTCH CONTROL
Filed Sept. 7, 1944  3 Sheets-Sheet 3
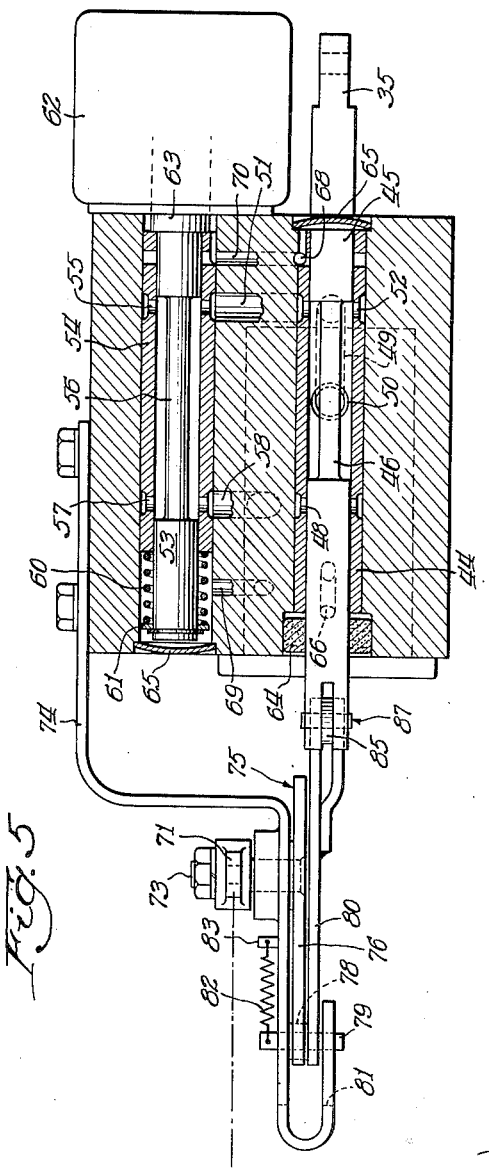
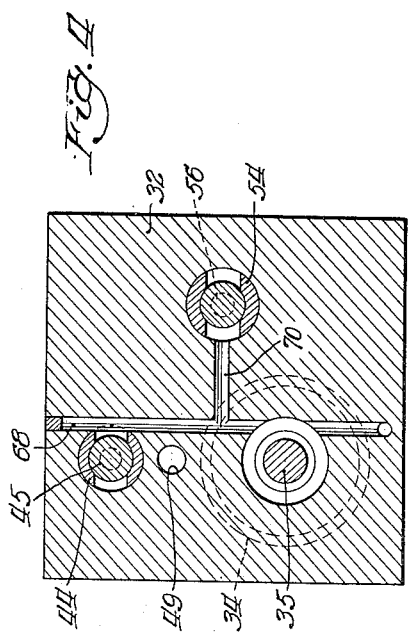
Inventor:
Donald W. Kelbel
By Edward C. Fitzhugh
Atty.

Patented Apr. 15, 1952

2,592,576

UNITED STATES PATENT OFFICE 2,592,576

CLUTCH CONTROL

Donald W. Kelbel, Muncie, Ind., assignor to Borg-Warner Corporation, Chicago, Ill., a corporation of Illinois Application September 7, 1944, Serial No. 552,952

18 Claims. (Cl. 192—.052)

My invention relates to clutch controls, and more particularly the invention relates to clutch controls which are particularly suitable for use in automotive vehicles.

It is an object of my invention to provide an improved control comprising power operated means for engaging and disengaging a clutch, and more particularly it is an object of the invention to provide such an improved clutch control in which the power operated means may be controlled to partially engage or disengage the clutch at the will of the operator. It is contemplated that the clutch operating mechanism shall preferably be under the control of the accelerator in the vehicle in which the clutch is installed, so that the clutch may be engaged or disengaged by movement of the accelerator while the accelerator is still in its closed throttle position and the throttle of the vehicle is opened after the clutch has been engaged.

It is a further object of the invention to provide improved mechanism of this type which is under the control of the mechanism for shifting the transmission of the vehicle and which is also under the control of a governor responsive to the speed of the driven shaft of the transmission such that the clutch is maintained in engaged condition regardless of any movement of the accelerator when the transmission is in direct drive and the speed of its driven shaft is above a predetermined value. It is contemplated that my improved clutch control shall preferably utilize fluid under pressure for operating the clutch.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a view showing in longitudinal section a transmission which may be used in an automotive vehicle and showing also other mechanism associated with the transmission;

Fig. 2 is a longitudinal sectional view of a clutch controlling valve and connected with various other controlling mechanism shown diagrammatically, the longitudinal section of the valve being taken substantially on line 2—2 of Fig. 3;

Fig. 3 is a sectional view taken on line 3—3 of Fig. 2;

Fig. 4 is a sectional view taken on line 4—4 of Fig. 2; and

Fig. 5 is a sectional view taken on line 5—5 of Fig. 3.

Like characters of reference designate like parts in the several views.

Referring now to the drawings and particularly to Fig. 1, there is illustrated a transmission 10 connected in tandem with a clutch 11 and with a motor 12. The clutch 11 is connected with the motor 12 by means of a shaft 13 which may be termed a drive shaft and the clutch 11 is connected with the transmission 10 by means of an intermediate shaft 14. The shaft 14 constitutes a driving shaft for the transmission 10, and the transmission comprises also a driven shaft 15.

The transmission 10 has not been shown in detail, since the details of the transmission do not constitute the invention; however, for the purposes of disclosing the invention, the transmission may be seen to comprise a gear 16 fixed with respect to the shaft 14 and carrying clutch teeth 17. A gear 18 is rotatably disposed on the shaft 15 and is driven from the gear 16 by countershaft gearing (not shown) so that the gear 18 rotates at a slower speed than the shaft 14. The gear 18 carries clutch teeth 19, and a collar 20 splined on the shaft 15 is adapted to interengage with either the clutch teeth 17 or the teeth 19. When the collar 20 is engaged with the teeth 17, the shaft 15 is driven at a one to one or direct drive from the shaft 14, and when the collar 20 is interengaged with the teeth 19, the shaft 15 is driven at intermediate speed which is less than that of the shaft 14. A gear 21 is splined on the shaft 15, and this gear is adapted to mesh with any suitable countershaft gearing (not shown) whereby when the gear 21 is shifted in one direction, a low speed drive is provided through the transmission and when the gear 21 is shifted in the opposite direction, a reverse drive is provided through the transmission.

The collar 20 is shifted by means of a shift arm 22 fixed on a shaft 23 which extends through the casing 24 of the transmission. The shaft 23 carries a shift lever 25 which when oscillated in one direction or the other by the lever 22 functions to shift the collar 20 either into engagement with the teeth 17 or with the teeth 19. The gear 21 is shifted from a shift lever 26 similar to the lever 22 by means of a similar mechanism (not shown) connecting the lever 26 and the gear 21. Interlock mechanism 27 of any suitable construction is preferably provided between the shaft 23 and the shaft (not shown) carrying the lever 26, whereby only one of the shift levers 22 and 26 may be shifted to put the transmission in an in-gear condition at one time. The construction of the interlock mechanism and other details of the transmission may be as shown in a copending application of Vaughn Haigh, Serial No. 480,631, now Patent No. 2,350,506, issued June 6, 1944.

The clutch 11 is under the control of the accelerator 28 (see Fig. 2) for the motor 12, and the accelerator and clutch are connected by means of a valve and piston mechanism 29. The arrangement is such that the clutch 11 may be engaged or disengaged by movement of the accelerator 28 while in a closed throttle position of the accelerator. A governor 30 driven by the shaft 15 and a switch mechanism 31 actuated when the transmission 10 is shifted between second or intermediate speed and direct drive (see Fig. 1) are electrically connected with the valve and piston mechanism 29 for overruling the accelerator 28 for operating the clutch 11 when the transmission 10 is in direct drive and the speed of the driven shaft 15 is above a predetermined value. When so overruled, the accelerator 28 is ineffective to disengage the clutch regardless of the movement given the accelerator.

The valve and piston mechanism 29 comprises a casing 32 having a cylindrical cavity 33 therein. A piston 34 having stems 35 is slidably disposed in the cavity 33, and the piston is connected by one of its stems and by any suitable linkage with the clutch 11. The piston 34 is yieldingly maintained in the position in which it is shown in Fig. 2 by means of a spring 36 disposed between the piston and an end of the cavity 33, as shown.

The clutch 11 comprises a pressure plate 37 fixed with respect to the shaft 13 and a pressure plate 38 which is yieldingly forced toward the pressure plate 37 by means of springs 39. A clutch disc 40 connected with the shaft 14 is disposed between the pressure plates 37 and 38, and the springs 39 are effective when the clutch is engaged to hold the pressure plates in gripping engagement with respect to the clutch disc. A plurality of clutch operating levers 41 acted on by a collar 42 are provided for disengaging the clutch when the collar is moved toward the pressure plate 37. A clutch operating lever 43 arranged to move the collar in such direction is provided, and this lever is linked with the piston 34. It is contemplated that the spring 36 acting on the piston 34 shall be of greater strength than the combined effect of the springs 39 acting through the pressure plate 38, the levers 41, the collar 42 and the lever 43, so that the spring 36 is effective to hold the piston 34 in its position as shown and to hold the pressure plate 38 disengaged from the clutch disc 40.

The casing 32 is provided with a cylindrical cavity therein in which is disposed a sleeve 44. A valve 45 provided with a constricted portion 46 is slidably disposed within the sleeve 44. The casing 32 is provided with an inlet opening 47 adapted to be connected with any suitable source of fluid under pressure, and this opening is in communication with openings 48 provided in the sleeve 44. The casing 32 is provided with a conduit 49 therein which is in communication with the cavity 33 at one end thereof and with openings 50 provided in the sleeve 44. The arrangement is such that when the valve 45 is moved to the left as seen in Fig. 2, whereby its constricted portion 46 brings the openings 48 and 50 of the sleeve 44 in communication, fluid under pressure flows from the inlet 47 through the sleeve 44 and through the conduit 49 into the cavity 33 to act on the piston 34. The piston 34 is thereby moved to the left, as seen in Fig. 2, against the action of the spring 36 to move the clutch operating lever 43 in a clockwise direction as seen in the figure and to thereby engage the clutch 11.

A conduit 51 (see Fig. 3) is provided in the valve and piston casing 32, and this conduit is connected with openings 52 provided in the sleeve 44. The conduit 51 constitutes a bleed or discharge conduit for fluid within the sleeve 44, and the conduit is connected with a valve 53 for controlling the fluid discharge. The valve 53 is disposed in a sleeve 54 which in turn is disposed in a suitable cavity within the casing 32. The conduit 51 is connected with openings 55 in the sleeve, as shown. The valve 53 is provided with a constricted portion 56 which, with the valve 53 being in its position as shown in Fig. 5, connects the openings 55 and the conduit 51 with other openings 57 in the sleeve. A conduit 58 is provided in the casing 32, and this conduit connects with the openings 57 in the sleeve 54 and is also in communication with the cavity 33. The cavity 33 is provided with a fluid bleed or discharge opening 59 therein, as shown. When the valves 45 and 53 are in their illustrated positions, any fluid under pressure within the cavity 33 acting on the piston 34 may flow through the conduit 49 around the constricted portion 46 of the valve 45, through the conduit 51, around the constricted portion 56 of the valve 53, and through the conduit 58, to be discharged through the outlet or bleed opening 59. It will thus be apparent that in the position of the valves 45 and 53 as shown in the drawings, the inlet opening 47 is blocked, and the cavity behind the piston 34 is connected with the fluid bleed opening 59, whereby fluid under pressure cannot act on the piston, and the spring 36 is effective to maintain the clutch 11 in disengaged condition.

The valve 53 is acted on by a spring 60 which is disposed between an end of the sleeve 54 and a ring 61 fixed to the valve. The spring 60 functions to yieldingly maintain the valve 53 in its position as shown in Fig. 5 for connecting the openings 55 and 57 in the sleeve by means of the constricted portion 56 of the valve. An electric solenoid 62 having an armature 63 connected with the valve 53 is provided for operating the valve to move it to the right, as shown in Fig. 5, against the action of the spring 60 to close off the opening 57 in the sleeve 54 and to thereby close the conduit 58. With the conduit 58 thus closed, any fluid within the cavity 33 acting on the piston 34 is prevented from bleeding from the cavity, and the piston 34 is maintained in a position for engaging the clutch 11 either fully or partially.

The piston stems 35 are made fluid tight with respect to the valve casing 32 by means of washers 64 of yielding material, and a washer 64 is provided at one end of the valve 45 for making the valve fluid tight at this end with respect to the casing 32. The valve 45 at its other end is made fluid tight by means of a cap 65. The valve 53 is made fluid tight at one end by means of a similar cap 65, and the solenoid 62 functions to make the valve fluid tight at its opposite end. A number of passages are provided in the casing 32 for bleeding the piston and valves at their ends. As shown in Fig. 2, the passages 66 and 67 in communication with the cavity 33 function to bleed the piston 34 and the valve 45 at ends thereof. A passage 68 (see Fig. 4) is in communication with the valve 45 and plunger 34 at their opposite ends, and this passage bleeds to the cavity 33 as shown. One end of the valve 53 has a bleed passage 69 in communication with the cavity 33 for bleeding this end of the valve, and the other end is in communication with a passage 70 which is connected with the passage 68 for bleeding this end of the valve 53.

Movement of the valve 45 is controlled by both the movement of the accelerator 28 and that of the piston 34. The valve 45 is connected with the accelerator 28 by means of an operating lever 71 which is linked with a lever 72 movable with the accelerator 28. The lever 71 is fixed on a shaft 73 which is rotatably disposed in a member 74 fixed to the valve casing 32. The lever 71 is connected by means of its shaft 73 with a cam 75 which has a dwell 76 and an acting portion 77. A roller 78 disposed on a shaft 79 which extends through a link 80 cooperates with the cam and functions as a follower with respect to the cam. The shaft 79 extends through slots 81 in adjacent parallel portions of the member 74, and the shaft 79 and roller 78 are guided in their movement thereby. A spring 82 is disposed between the shaft 79 and a pin 83 fixed with respect to the member 74, and the spring functions to hold the roller in contact with the cam 76. The link 80 has a pivotal connection 84 with a differential lever or link 85, and the link 85 has a pivotal connection 86 with the piston stem 35 and has a pin and slot connection 87 with the valve 45.

When the valve 45 is in its position as shown in Fig. 2, and assuming the valve 53 remains in its position as shown in Fig. 5, the cavity 33 behind the piston 34 is in communication with the bleed opening 59 through the conduit 49, the sleeve 44, the conduit 51, the sleeve 54, the conduit 58, and the cavity 33, so that there is no fluid tending to move the clutch operating lever 43 to engage the clutch. When the accelerator 28 is moved from its position as shown in Fig. 2 in a counterclockwise direction, the lever 71 and cam 75 are moved in similar directions of rotation whereby the roller 78 is moved by the acting portion 77 of the cam to the left as seen in Fig. 2. The link 80 is also moved in such direction by the roller, and such movement of the link 80 causes a counterclockwise rotation of the link 85 about its pivotal connection 86 with the piston stem 35. Such movement of the link 85 causes the valve 45 to be moved to the left as seen in Fig. 2 to connect the openings 48 and 50 in the sleeve 44 by means of the constricted portion 46 of the valve and to close the openings 52 and thereby the bleed conduit 51. Fluid under pressure thereafter flows from the inlet 47 around the constricted portion 46 of the valve and through the conduit 49 to the cavity 33 to move the piston 34 to the left as seen in Fig. 2 and to thereby move the clutch operating lever 43 toward clutch engaged position. Assuming that only a small movement of the lever 71 and cam 75 is made, such movement of the piston 34 causes a pivotal movement of the link 85 about its connection 84 with the lever 80 so as to move the valve 45 back to a position where both the openings 48 and 52 are closed. With a closure of the openings 48, there will be no additional such movement of the piston 34 and of the clutch operating lever 43, as is apparent. A small additional movement of the accelerator 28 in the counterclockwise direction will cause in the same manner a small additional movement of the piston 34 and clutch operating lever 43 toward positions fully engaging the clutch 11. It will thus be apparent that by small movements of the accelerator, the clutch 11 may be partially engaged or may be brought to fully engaged condition as slowly as desired.

With the clutch 11 being engaged, when the accelerator 28 is moved in the clockwise direction, the lever 71 and cam 75 are moved also in such a direction to move the roller 78 downwardly on the cam portion 77 and to move the link 80 to the right as seen in Fig. 2. Such movement of the link 80 will cause the link 85 to be turned in the clockwise direction about its pivotal connection 86 with the piston stem 35 causing the valve 45 to be moved to the right as seen in Fig. 2. When the openings 52 in the sleeve 44 are opened on such movement of the valve 45, fluid is discharged through the conduits 49, 51 and 58 and around the valves 45 and 53 to the cavity 33 and through the discharge opening 59. The piston 34 thereupon moves to the right under the action of the spring 36 and moves the clutch operating lever 43 toward its clutch disengaging position. Such movement of the piston 34 will, however, cause a movement of the valve 45 to the left due to the differential action of the link 85 which moves about its connection 84 with the lever 80. Assuming the initial movements of the accelerator 28 and the link 80 were small, the valve 45 will be moved to a position where both the openings 52 and 48 in the sleeve 44 are closed by the valve, and movement of the piston 34 ceases. Additional small movements of the piston 34 to disengage the clutch 11 may be made similarly by giving small increments of movement to the accelerator 28 in the clockwise direction. It will thus be evident that by proper movements of the accelerator 28, the clutch 11 may be partially disengaged or the clutch may be brought from fully engaged condition to fully disengaged condition as slowly as is desired.

The lever 72 movable with the accelerator 28 is connected with the operating lever 88 of the carburetor 89 for the engine 12 by means of a lost motion connection 90. The lost motion connection is such that movement of the accelerator 28 in a counterclockwise direction does not begin to move the throttle lever 88 from its idling position to more fully open the carburetor until the cam 75 has been moved so that the follower roller 78 is on the dwell 76 of the cam. The lost motion connection 90 thus functions to delay opening of the carburetor 89 until the clutch 11 has been fully engaged by the power operated piston 34. As has been described, the clutch 11 is engaged when the accelerator is moved toward open throttle position and is disengaged on movement of the accelerator in the opposite direction, and the clutch control thus functions to effectively allow a free wheeling of the vehicle in which the transmission is installed.

The solenoid 62 is operated according to the speed ratio for which the transmission 10 is conditioned and according to the speed of the driven shaft 15 of the transmission. One lead 91 of the solenoid 62 is grounded (see Fig. 1) and its other lead 92 is connected with a switch 93 in the form of a pair of normally open contacts. The switch 93 is actuated by a cam 94 which is provided on the transmission shifting lever 22. The cam 94 is such that in its neutral and second speed positions, the switch 93 is open, and the cam 94 is provided with a recess 95 in its third speed position whereby the switch 93 is closed when the transmission is conditioned for direct drive. The switch 93 is connected by means of a lead 96 with a switch 97 in the form of a pair of normally open contacts which are actuated by the governor 30. The governor construction is such that the switch 97 is closed above a predetermined speed of the driven shaft, such as a speed, for example, corresponding to approximately eight miles per hour speed of the vehicle in which the transmission is installed. The switch 97 is connected by means of a lead 98 with the battery 99 of the vehicle which is, of course, grounded at one terminal thereof.

The governor 30 and switch structure 31 function, when the speed of the shaft 15 is above the critical governor speed and the shift lever 22 is in its position conditioning the transmission 10 for direct drive ratio, so that a circuit is completed from the battery 99 through the leads 98, 96, 92, and 91 to energize the solenoid 62. Upon such energization, the solenoid moves the valve 53 to the right as seen in Fig. 5 to close the openings 57 in the sleeve 54, and the valve 53 thereby stops any fluid discharge through the conduits 51 and 58. With the clutch 11 being fully engaged and the piston 34 being moved to the left as seen in Fig. 2, while the valve 53 closes the openings 57, the clutch 11 remains engaged, and it is not disengaged upon a release by the operator of the accelerator to the closed throttle position of the accelerator. The solenoid 62 and its valve 53 thus function to prevent a free wheeling drive of the shaft 15 and of the vehicle above the critical speed of the vehicle while the transmission 10 is conditioned for direct drive.

In brief the operation of my improved clutch operating mechanism is as follows: While the transmission 10 is conditioned for other than direct drive or while the speed of the driven shaft 15 is below the critical value, the clutch 11 may be engaged partially or as slowly as desired by corresponding counterclockwise movement of the accelerator 28. When the clutch 11 is engaged, further movement of the accelerator 28 will open the carburetor 89 for increasing the speed of the motor 12. The clutch 11 may be disengaged by simply moving the accelerator in the opposite direction, and disengagement may be made partial or as slowly as desired. When the transmission is conditioned for direct drive, and while the speed of the driven shaft 15 is above its critical governor speed, the clutch 11 will remain in engaged condition, and the automobile will not free wheel.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In power transmission mechanism, the combination of a drive shaft, a driven shaft, a friction clutch for completing a drive between said shafts, said clutch comprising spring means for engaging the clutch, a power device comprising a piston connected to operate said clutch, a spring associated with said power device and acting on said piston and of greater strength than said spring means whereby to disengage the clutch, a fluid-pressure source connected to said device to operate said piston, a valve effective between said fluid pressure source and said piston for applying fluid pressure to the piston to engage the clutch, and a control linked with said piston and said valve whereby the piston moves approximately proportionally to the movement given the control.

2. In power transmission mechanism for an automotive vehicle, the combination of a drive shaft, a driven shaft, a friction clutch for completing a drive between said shafts, said clutch comprising spring means for engaging the clutch, a power device comprising a piston connected to operate said clutch, a spring associated with said power device and acting on said piston and of greater strength than said spring means whereby to disengage the clutch, a fluid pressure source connected to said power device to operate said piston, a valve effective between said fluid pressure source and said piston and adapted to apply fluid pressure to the piston to overcome said spring and engage the clutch or to relieve the fluid pressure acting on the piston to allow the spring to be effective to disengage the clutch, and an accelerator for the engine of the vehicle, said accelerator being linked with said piston and said valve whereby when the accelerator is moved from a closed throttle position toward open throttle position the piston moves approximately proportionally to the movement given the accelerator to engage the clutch, said accelerator being effective to accelerate the vehicle engine after said clutch has been engaged.

3. In power transmission mechanism, the combination of drive and driven shafts, a change speed mechanism for driving the driven shaft, a clutch for completing a drive between the drive shaft and the change speed mechanism, a power device comprising a piston connected to operate said clutch, a source for fluid under a pressure other than atmospheric and connected to said power device to operate said piston, a valve effective between said source and said piston for controlling the operation of the clutch, a control linked with said valve and said piston whereby the piston moves approximately proportionally to the movement given the control, a valve connected with said source and piston which may be effective to prevent disengagement of said clutch after it has been engaged, positionable means for shifting the change speed mechanism from one speed ratio to the other, an electric solenoid for operating said second-named valve, a circuit for said solenoid, a governor responsive to the speed of rotation of said driven shaft, a pair of normally open contacts disposed in said circuit and adapted to become closed under the control of said governor when said driven shaft exceeds a predetermined rate of rotation, and a second pair of contacts disposed in said solenoid circuit and adapted to become closed under the control of said positionable shifting means when the latter assumes a position wherein said change-speed mechanism is in a selected speed ratio, said pairs of contacts, when closed concurrently, serving to energize the solenoid circuit and thus cause clutch engagement.

4. In power transmission mechanism, the combination of drive and driven shafts, positionable change-speed mechanism for driving the driven shaft, a clutch for completing a drive between the drive shaft and the change speed mechanism, a power device comprising a piston connected to operate said clutch, a source for fluid under a pressure other than atmospheric and connected to said power device to operate said piston, a valve effective between said source and said piston for controlling the operation of said piston and clutch, a control linked with said valve and said piston whereby the piston moves approximately proportionally to the movement given the control, a second valve connected with said source and piston which may be effective to prevent disengagement of said clutch after it has been engaged, a governor responsive to the speed of said driven shaft, a solenoid for operating said second-named valve, a circuit for said solenoid, and circuit making and breaking means operable under the joint control of said governor when the speed of the driven shaft exceeds a predetermined minimum and of said positionable change-speed mechanism assumes a predetermined position for energizing the solenoid circuit to cause clutch engagement.

5. In power transmission mechanism for an automotive vehicle, the combination of drive and driven shafts, a transmission for driving said driven shaft, a clutch for completing a drive from said drive shaft to the transmission, a power device comprising a piston connected to operate said clutch, a source for fluid under pressure connected to said power device to operate said piston, a valve effective between said pressure source and said piston, an accelerator for the vehicle and connected with said valve, a second valve connected with said source and said piston which may be effective to prevent disengagement of said clutch after it has been engaged, a governor responsive to the speed of said driven shaft, means for shifting said transmission from one speed ratio to another, an electric solenoid for operating said second named valve, and switches operated by said shifting means and by said governor and connected in series with said solenoid for maintaining the clutch engaged when said transmission is in a certain one of its speed ratios and the speed of said driven shaft is above a predetermined value.

6. In power transmission mechanism, the combination of drive and driven shafts, a friction clutch for completing a drive between said shafts, a power device comprising a piston connected to operate said clutch, a source for fluid under pressure connected to said power device to operate said piston, a valve effective between said fluid pressure source and said piston for applying fluid under pressure to the piston in one position of the valve to move the piston and thereby engage the clutch, said valve in another position effectively disconnecting said pressure source from said piston and opening a conduit for draining fluid acting on said piston whereby for disengaging the clutch, and a second valve in said conduit for selectively closing said conduit for preventing draining of fluid acting on said piston and disengagement of said clutch.

7. In power transmission mechanism, the combination of drive and driven shafts, a friction clutch for completing a drive between said shafts, a power device comprising a piston connected to operate said clutch, a source for fluid under pressure connected to said power device to operate said piston, a valve effective between said fluid pressure source and said piston for applying fluid under pressure to the piston in one position of the valve to move the piston and thereby engage the clutch, said valve in another position thereof effectively disconnecting said pressure source from said piston and opening a conduit for draining fluid acting on the piston whereby for disengaging the clutch, a control linked with said piston and said valve whereby the piston moves approximately proportionally to the movement given the control for partially engaging or disengaging the clutch, and a second valve in said conduit for selectively closing the conduit for preventing draining of fluid acting on said piston and for thereby preventing disengagement of said clutch.

8. In power transmission mechanism, the combination of drive and driven shafts, a friction clutch for completing a drive between said shafts and comprising spring means for engaging the clutch, a power device comprising a piston connected to operate said clutch, a spring associated with said power device and acting on said piston and of greater strength than said spring means whereby to disengage the clutch, a source for fluid under pressure connected to said power device to operate said clutch, a valve effective between said fluid pressure source and said piston for applying fluid under pressure to the piston in one position of the valve to move the piston against said spring and thereby engage the clutch, said valve in another position effectively disconnecting said pressure source from said piston and opening a conduit for draining fluid under pressure acting on the piston whereby for disengaging the clutch, a control linked with said piston and said valve whereby the piston moves approximately proportionally to the movement given the control for selectively partially engaging or disengaging the clutch, and a second valve in said conduit for selectively closing the conduit for preventing the draining of fluid acting on said piston and for thereby preventing disengagement of said clutch.

9. In power transmission mechanism, the combination of drive and driven shafts, a change speed mechanism for driving the driven shaft, a friction clutch for completing a drive between the drive shaft and the change speed mechanism, a power device comprising a piston connected to operate said clutch, a source for fluid under pressure connected to said power device to operate said piston, a valve effective between said fluid pressure source and said piston for applying fluid under pressure to the piston in one position of the valve to move the piston and thereby engage the clutch, said valve in another position effectively disconnecting said pressure source from said piston and opening a conduit for draining fluid acting on said piston whereby for disengaging the clutch, a control linked with said piston and said valve whereby the piston moves approximately proportionally to the movement given the control for engaging or disengaging the clutch partially or completely, a valve in said conduit for selectively closing the conduit for preventing the draining of fluid acting on said piston and for thereby preventing the disengagement of said clutch, control mechanism for said second-named valve, positionable means for shifting the change-speed mechanism from one speed ratio to another, and a governor responsive to the speed of said driven shaft, said control mechanism operating under the joint control of said positionable means of said governor to maintain said second-named valve in its closed position to thereby maintain the clutch engaged when said positionable means assumes a predetermined position and said driven shaft exceeds a predetermined rate of rotation.

10. In power transmission mechanism for an automotive vehicle, the combination of drive and driven shafts, a friction clutch for completing a drive between said shafts and comprising spring means for engaging the clutch, a power device comprising a piston connected to operate said clutch, a spring associated with said power device and acting on said piston and of greater strength than said spring means whereby to disengage the clutch, a source for fluid under pressure connected to said power device to operate said piston, a valve effective between said fluid pressure source and said piston for applying fluid under pressure to the piston in one position of the valve to move the piston against the action of said spring and thereby engage the clutch, said valve in another position effectively disconnecting said pressure source from said piston and opening a conduit for draining fluid acting on the piston whereby said spring is effective to disengage the clutch, an accelerator for the engine of the vehicle and linked with said valve and said piston whereby the piston moves approximately proportionally to said accelerator, said accelerator when moved from a closed throttle to an open throttle position first causing an engagement of said clutch and then opening the throttle of the vehicle engine, a valve in said conduit for selectively closing the conduit for preventing the draining of fluid acting on said piston and thereby preventing disengagement of said clutch, a change speed transmission driven by said clutch and driving said driven shaft, means for shifting the transmission from one speed ratio to another, a governor responsive to the speed of said driven shaft, an electric solenoid for operating said second named valve, and switches operated by said shifting means and by said governor and connected in series with said solenoid whereby said second named valve is maintained in its conduit closing position when the speed of said driven shaft is above a predetermined value and said transmission is in a certain one of its said speed ratios.

11. In power transmission mechanism, the combination of a drive shaft, a driven shaft, mechanism for completing a power train between said shafts and having shaft-coupling and uncoupling conditions, said coupling mechanism comprising spring means for effecting one of its said conditions, a power device comprising a power source and a power-operated member connected thereto for effecting operation of said coupling mechanism, a spring associated with said power device and acting on said member and of greater strength than said spring means whereby to effect the other of said conditions of said coupling mechanism, a valve effective between said power source and said member for applying power to the member to effect operation of the coupling mechanism to obtain the first-mentioned condition of said coupling mechanism, and a control linked with said member and said valve whereby the member moves approximately proportionately to the movement given the control.

12. In power transmission mechanism for an automotive vehicle, the combination of a drive shaft, a driven shaft, mechanism for completing a power train between said shafts and having shaft-coupling and uncoupling conditions, said coupling mechanism comprising spring means for effecting one of its said conditions, a power device comprising a power source and a power-actuated member connected to said source for effecting operation of said coupling mechanism, a spring associated with said power device and acting on said member and of greater strength than said spring means whereby to effect the other of said conditions of said coupling mechanism, a valve effective between said power source and said member and adapted to apply power to the member to overcome said spring and to obtain said first-mentioned condition of said coupling mechanism or to relieve the power acting on the member to allow the spring to be effective to obtain the second-mentioned relationship, and an accelerator for the engine of the vehicle, said accelerator being linked with said member and said valve whereby when the accelerator is moved from a closed throttle position toward open throttle position the member moves approximately proportionally to the movement given the accelerator to effect said first-mentioned condition of said coupling mechanism, said accelerator being effective to accelerate the vehicle engine after said coupling mechanism has been operated to effect said first-mentioned condition.

13. In power transmission mechanism, the combination of drive and driven shafts, a positionable change speed mechanism for selectively driving the driven shaft from the drive shaft at different speed ratios, mechanism for completing a power train between said drive shaft and said change speed mechanism and having coupling and uncoupling conditions with respect thereto, a power device comprising a power source and a power-actuated member connected thereto for controlling said coupling mechanism to change the mechanism from one of its said conditions to the other, a valve effective between said source and said member for operating said member and thereby said coupling mechanism, a control linked with said valve and said member whereby the member moves approximately proportionally to the movement given the control, a second valve connected with said source and said member which may be effective to prevent a change of conditions of said coupling mechanism after it has been operated to obtain one of said conditions, a governor responsive to the speed of the driven shaft, and an electric solenoid for operating said second-named valve and operable upon energization thereof to cause said latter valve to maintain the device in its coupling condition, a circuit for said solenoid, and circuit making and breaking mechanism operable under the joint control of said governor and of said positionable change-speed mechanism for energizing the solenoid circuit and consequently the solenoid when the speed of the driven shaft exceeds a predetermined minimum and when said change-speed mechanism assumes a predetermined position.

14. In a power transmission mechanism, a combination of drive and driven shafts, mechanism for completing a power train between said shafts and having shaft-coupling and uncoupling conditions, a power device comprising a power source and a piston connected thereto for controlling said coupling mechanism to change the mechanism from one of its said conditions to the other, a valve effective between said source and said piston for applying power to the piston in one position of the valve to move the piston and thereby effect operation of said coupling mechanism to obtain one of said conditions, said valve in another position effectively disconnecting said power source from said piston and opening a passage for bypassing power acting on said piston whereby to effect operation of the coupling mechanism to obtain the other of said conditions, and a second valve in said passage for selectively closing said passage for preventing the bypassing of power acting on said piston and operation of said device to obtain said second-named condition.

15. In power transmission mechanism, the combination of a drive shaft, a driven shaft, a friction device for effecting and interrupting the transmission of power between said shafts, said device comprising spring means for operating said device to effect the transmission of power between said shafts, a power device comprising a pressure fluid source and a piston connected thereto for operating said friction device, a spring associated with said power device and acting on said piston and of greater strength than said spring means whereby to effect operation of said friction device to interrupt the transmission of power between said shafts, a valve effective between said source and said piston for applying pressure fluid to the piston to operate said friction device to effect the transmission of power between said shafts, and a control connected to said piston and said valve whereby the piston moves approximately proportionally to the movement given the control.

16. In power transmission mechanism, the combination of a drive shaft, a driven shaft, a friction device for effecting and interrupting the transmission of power between said shafts, said device comprising spring means for operating said device to effect the transmission of power between said shafts, a power device comprising a pressure fluid source and a piston connected thereto for operating said friction device, a spring associated with said power device and acting on said piston and of greater strength than said spring means whereby to effect operation of said friction device to interrupt the transmission of power between said shafts, a valve effective between said source and said piston and adapted to apply pressure fluid to the piston to overcome said spring and to operate said friction device to effect the transmission of power between said shafts, or to relieve the fluid pressure acting on the piston to allow the spring to be effective to operate the friction device to interrupt the transmission of power between said shafts, and an accelerator for the engine of the vehicle, said accelerator being connected to said piston and said valve whereby when the accelerator is moved from a closed throttle position toward open throttle position the piston moves approximately proportionally to the movement given the accelerator to operate the friction device to effect the transmission of power between said shafts, said accelerator being effective to accelerate the vehicle engine after said last-mentioned operation of said friction device.

17. In a power transmission mechanism, the combination of drive and driven shafts, a positionable change speed mechanism for selectively driving the driven shaft from the drive shaft at different speed ratios, a friction device for effecting and interrupting the transmission of power between said drive shaft and said change speed mechanism, a power device comprising a pressure fluid source and a piston connected thereto to operate said friction device, a valve effective between said source and said piston for operating said friction device, a control connected to said piston and said valve whereby the piston moves approximately proportionally to the movement given the control, a valve connected with said source and piston which may be effective to prevent operation of said friction device to interrupt the transmission of power between said drive shaft and said change speed mechanism after it has been operated to effect the transmission of power between said drive shaft and change speed mechanism, a governor responsive to the speed of the driven shaft, and an electric solenoid for operating said second-named valve and operable upon energization thereof to cause said latter valve to maintain the friction device operative to effect the transmission of power between said drive shaft and said change-speed mechanism, a circuit for said solenoid, and circuit making and breaking mechanism operable under the joint control of said governor and of said positionable change-speed mechanism for energizing the solenoid circuit and consequently the solenoid when the speed of the driven shaft exceeds a predetermined minimum and when said change-speed mechanism assumes its predetermined position.

18. In power transmission mechanism, the combination of drive and driven shafts, a friction device for effecting and interrupting the transmission of power between said shafts, a power device comprising a pressure fluid source and a piston connected thereto to operate said friction device, a valve effective between said source and said piston for applying fluid under pressure to the piston in one position of the valve to move the piston and thereby to operate the friction device to effect the transmission of power between said shafts, said valve in another position effectively disconnecting said source from said piston and opening a passage for draining fluid acting on said piston whereby to effect operation of said friction device to interrupt the transmission of power between said shafts, and a second valve in said passage for selectively closing said passage for preventing draining of fluid acting on said piston and thereby operation of said friction device to interrupt the transmission of power between said shafts.

DONALD W. KELBEL.

REFERENCES CITED

The following references are of record in the file of this patent:

UNITED STATES PATENTS

| Number | Name | Date |
|---|---|---|
| 1,729,173 | Marfaing | Sept. 24, 1929 |
| 1,993,015 | Moorhouse | Mar. 5, 1935 |
| 2,049,738 | Hill et al. | Aug. 4, 1936 |
| 2,071,983 | McCollum et al. | Feb. 23, 1937 |
| 2,114,221 | Gillett | Apr. 12, 1938 |
| 2,426,064 | Stevens | Aug. 19, 1947 |